US012604142B2

(12) United States Patent
Jin et al.

(10) Patent No.: US 12,604,142 B2
(45) Date of Patent: Apr. 14, 2026

(54) MULTIFUNCTIONAL SOUNDING DEVICE

(71) Applicant: AAC Microtech (Changzhou) Co., Ltd., Changzhou (CN)

(72) Inventors: Xin Jin, Changzhou (CN); Fan Zhang, Changzhou (CN); Ronglin Linghu, Changzhou (CN); Wei Song, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 310 days.

(21) Appl. No.: 18/341,744

(22) Filed: Jun. 26, 2023

(65) Prior Publication Data

US 2024/0147165 A1 May 2, 2024

Related U.S. Application Data

(63) Continuation of application No. PCT/CN2022/134573, filed on Nov. 28, 2022.

(30) Foreign Application Priority Data

Oct. 28, 2022 (CN) ......................... 202222869377.3

(51) Int. Cl.
*H04R 25/00* (2006.01)
*H04R 7/06* (2006.01)
*H04R 9/06* (2006.01)

(52) U.S. Cl.
CPC ................. *H04R 9/06* (2013.01); *H04R 7/06* (2013.01); *H04R 2499/11* (2013.01)

(58) Field of Classification Search
CPC .. H04R 1/06; H04R 2400/03; H04R 2400/07; H04R 2400/11; H04R 2499/11; H04R 7/06; H04R 9/025; H04R 9/06
USPC .......................................................... 381/396
See application file for complete search history.

(56) References Cited

FOREIGN PATENT DOCUMENTS

WO WO-2024087295 A1 * 5/2024 ............... H04R 9/06

OTHER PUBLICATIONS

WO2024087295A1. Search Report. English Translation (Year: 2024).*
WO2024087295A1. Written Opinion. English Translation (Year: 2024).*

* cited by examiner

*Primary Examiner* — Phylesha Dabney
(74) *Attorney, Agent, or Firm* — Wiersch Law Group

(57) ABSTRACT

The present disclosure provides a multifunctional sounding device, including a housing body with a containment space and a sounding unit accommodated in the containment space. The sounding unit includes a frame, a vibration system, and a magnetic circuit system. The sounding device further includes a motor assembly accommodated in the containment space, having a vibration unit with a voice coil disposed on a side of the magnetic circuit system away from the vibration system, and an elastic member suspending the vibration unit in the containment space. The overall thickness of the multifunctional sounding device of the present disclosure is small, the volume is small, and the acoustic performance is excellent; this structure also reduces the cost of parts and assembly costs, making the multifunctional sounding device widely used.

9 Claims, 6 Drawing Sheets

MULTIFUNCTIONAL SOUNDING DEVICE

TECHNICAL FIELD

The present disclosure relates to electro-acoustic transducers, especially to a multifunctional sounding device.

BACKGROUND ART

With the advent of the mobile Internet era, the number of smart mobile devices continues to rise. Among the many mobile devices, the mobile phone is undoubtedly the most common and portable mobile terminal device. At present, the functions of mobile phones are extremely diverse, including high-quality music functions and vibration functions. Therefore, the sounding device for having vibration functions and playing sounds is widely used in current smart mobile devices.

The sounding device in the related art includes a housing body, a sounding unit and a motor assembly accommodated in the housing body. The sounding unit includes a frame, a vibration system fixed on the frame, and a magnetic circuit system with the magnetic gap which is also fixed on the frame. The motor assembly is pasted to the side of the magnetic circuit system away from the vibration system.

The sounding unit and the motor assembly in the sounding device in the related art can be controlled independently, however, since the motor assembly is stacked beneath the sounding unit, leading to an increase in the thickness of the sounding device, thus it is challenging to reduce the thickness of the sounding device. In addition, the magnets of the sounding unit and the motor assembly are not on the same plane, and the driving forces of their respective magnetic fields interfere and affect each other. As a result, the magnets in the sounding device are large in number, resulting in a bulky volume that cannot be miniaturized, which makes the acoustic performance and vibration performance of the sounding device poor.

Therefore, it is really necessary to provide a new the multifunctional sounding device to solve the above technical problems.

SUMMARY OF THE INVENTION

The present disclosure is to provide a multifunctional sounding device with small overall thickness, small volume and excellent acoustic performance.

In order to achieve the above-mentioned object, the present disclosure provides a multifunctional sounding device, including: a housing body with a containment space and a sounding unit accommodated in the containment space. The sounding unit includes a frame, a vibration system, and a magnetic circuit system with a magnetic gap for driving the vibration system to vibrate and produce sound. The sounding device further includes a motor assembly accommodated in the containment space, having a vibration unit with a voice coil disposed on a side of the magnetic circuit system away from the vibration system, and an elastic member suspending the vibration unit in the containment space. The magnetic circuit system includes a main magnetic circuit, a first auxiliary magnetic circuit, and a second auxiliary magnetic circuit respectively surrounding the main magnetic circuit and forming a magnetic gap with the main magnetic circuit. The main magnetic circuit and the first auxiliary magnetic circuit are fixed to the housing body, and the second auxiliary magnetic circuit is fixed to the vibration unit.

In addition, the main magnetic circuit includes a main magnet and a main pole plate assembled with the main magnet; the magnetic circuit system also includes a first support frame fixed on the side of the main magnet away from the vibration system; the first support frame is fixed to the housing body; and, the first support frame and the main pole plate are respectively fixed on opposite sides of the main magnet.

In addition, the first auxiliary magnetic circuit includes a first auxiliary magnet surrounding the main magnet and forming a magnetic gap with the main magnet through space, and a first auxiliary pole plate attached to the first auxiliary magnet; one end of the first auxiliary pole plate is fixed to a side of the first auxiliary magnet close to the vibration system, and the other end of the first auxiliary pole plate is fixed to the housing body.

In addition, the second auxiliary magnetic circuit includes a second auxiliary magnet surrounding the main magnet and forming a magnetic gap with the main magnet and a second auxiliary pole plate disposed on the second auxiliary magnet; the second auxiliary magnet is fixed to the vibration unit; the driving coil and the second auxiliary pole plate are respectively positioned on opposite sides of the second auxiliary magnet; further, the multifunctional sounding device includes two first auxiliary magnets positioned on opposite sides of a short axis of the main magnet, and two second auxiliary magnets positioned on opposite sides of a long axis of the main magnet.

Further, the multifunctional sounding device includes two driving coils which are respectively arranged on opposite sides of the first support frame along a vibration direction of the vibration unit.

Further, the vibration unit further includes a weight being fixed with the driving coil and having two opposite sides suspended by the elastic members along the vibration direction of the vibration unit; the weight further includes an installation hole through which the first support frame passes and is fixed to the housing body.

Further, an amount of the elastic member is two, and the two elastic members are respectively arranged on opposite sides of the weight along the vibration direction of the vibration unit.

In addition, the motor assembly further includes a conductive connector electrically connected to the driving coil; the conductive connector includes a fixed part fixed on the side of the weight away from the vibration system, an elastic arm bent and extended by the fixed part, and an extension part passing through the housing body and at least partially exposed on the housing body.

In addition, the vibration system includes a diaphragm fixed on the frame, a voice coil inserted in the magnetic gap and driving the vibration of the diaphragm, a skeleton fixed to the diaphragm, and an elastic support assembly spaced apart from the diaphragm; the diaphragm is pasted and fixed on the housing body. The diaphragm and the housing body together form the back cavity; the voice coil is suspended within the magnetic gap by the skeleton; the elastic support assembly is arranged on the same side as the first auxiliary magnet; one end of the elastic support assembly is fixed to the frame; the other end of the elastic support assembly is fixed to the skeleton.

In addition, the housing body includes an upper cover and a lower cover covering the upper cover; the upper cover includes a sound outlet penetrating therethrough; the diaphragm is pasted and fixed on the upper cover and set opposite to the sound outlet; the lower cover has a protrusion part protruding toward the direction close to the magnetic circuit system; the first support frame is fixed to the protrusion part.

Compared with related technologies, the multifunctional sounding device of the present disclosure includes a housing body with a containment space, a sounding unit accommodated in the containment space and a motor assembly. In the multifunctional sounding device of the present disclosure, a magnetic circuit system is arranged through the sounding unit. The magnetic circuit system includes a main magnetic circuit, a first auxiliary magnetic circuit and a second auxiliary magnetic circuit respectively surrounding the main magnetic circuit and forming a magnetic gap with the main magnetic circuit with space. In the multifunctional sounding device of the present disclosure, a vibration unit with a driving coil and an elastic member are also set through the motor assembly; the main magnetic circuit is fixed to the housing body; the first auxiliary magnetic circuit is fixed to the housing body; the second auxiliary magnetic circuit is fixed to the vibration unit.

Such a structure enables both the driving coil and the second auxiliary magnetic circuit in the vibration unit of the motor assembly to be suspended in the containment space through the elastic member The second auxiliary magnetic circuit, as a part of the vibration weight of the vibration unit, can reduce the counterweight of the weight in the vibration unit, release part of the volume of the weight. In the housing body with the same external volume, the volume released by the weight can be converted into the cavity of the back cavity of the sounding unit, which is beneficial to the performance improvement of the sounding unit.

Therefore, when the driving coil is energized, the main magnetic circuit fixed to the housing body and the first auxiliary magnetic circuit simultaneously provide driving force for the driving coil. Thus, the motor assembly does not need to be arranged with the magnet as the stator, and the saved volume is provided to the containment space. As a result, the multifunctional sounding device of the present disclosure has a small overall thickness, small volume, and excellent acoustic performance. This structure also reduces the cost of parts and assembly, so that the multifunctional sounding device can be widely used.

DETAILED DESCRIPTION OF EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

The present disclosure provides a multifunctional sounding device 100.

Figure 1:
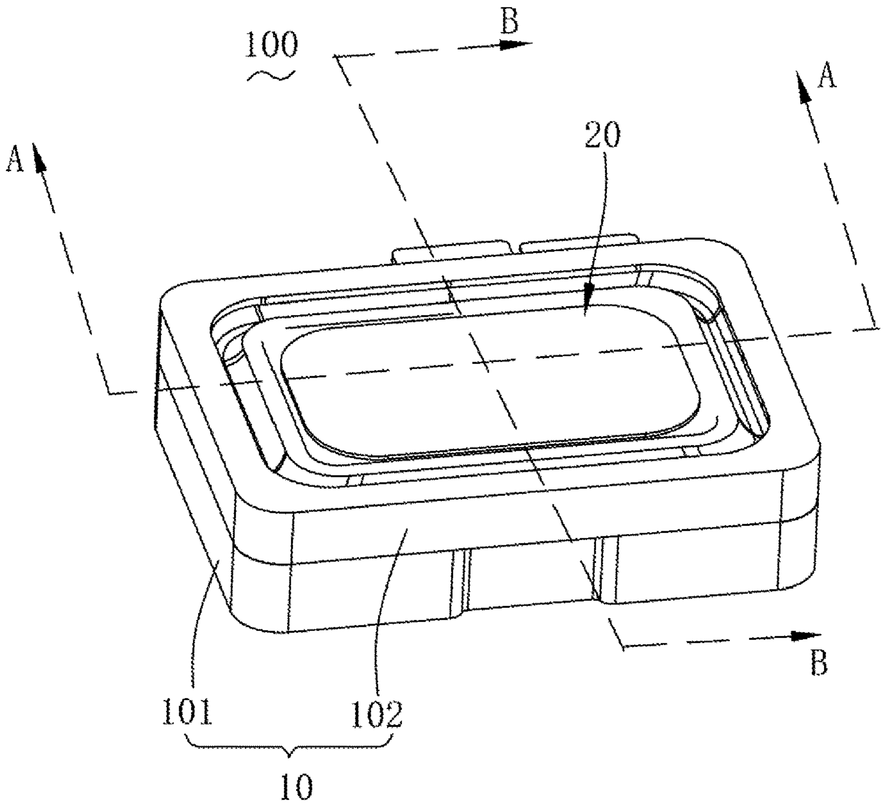
FIG. 1 is an isometric view of a multifunctional sounding device in accordance with an exemplary embodiment of the present disclosure.
Figure 2:
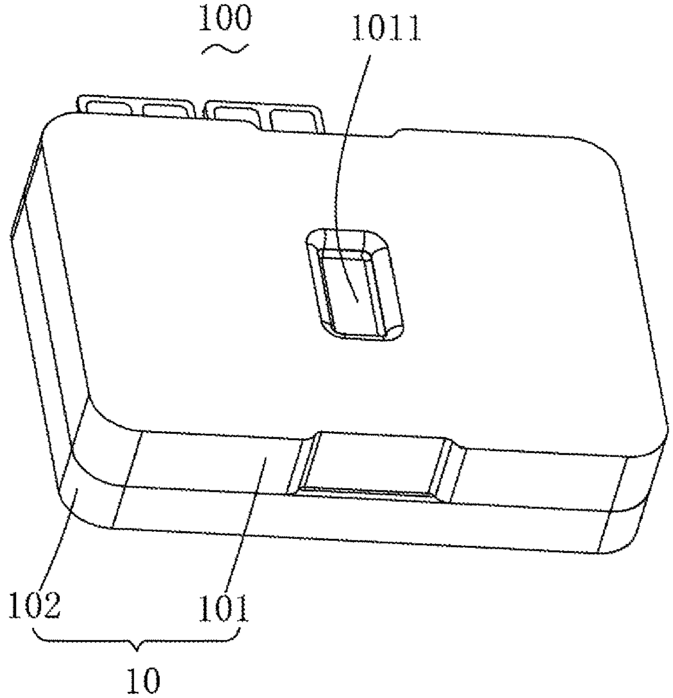
FIG. 2 is an isometric view of the multifunctional sounding device from another aspect.
Figure 3:
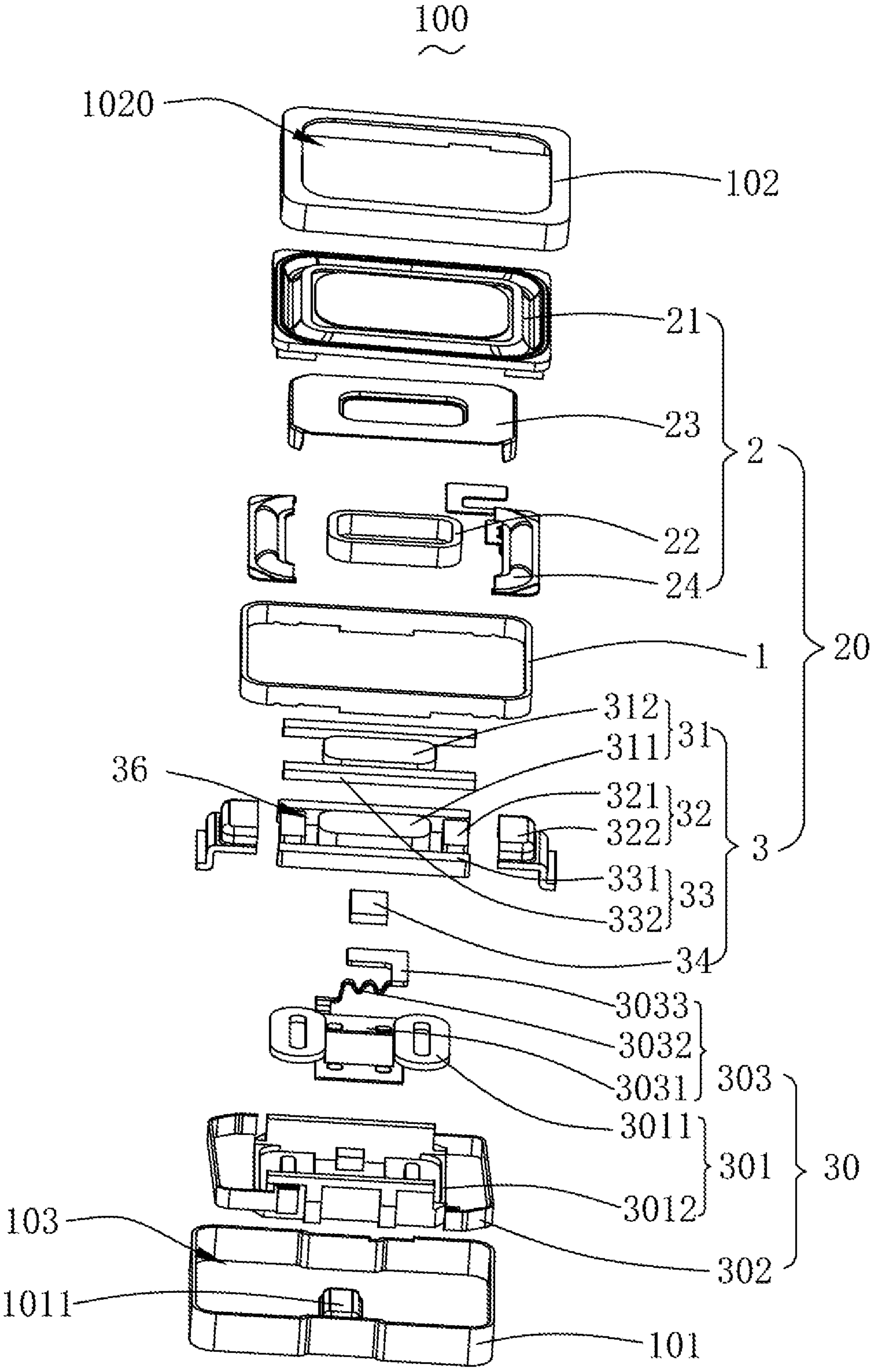
FIG. 3 is an exploded and isometric view of the multifunctional sounding device of the present disclosure.
Figure 4:
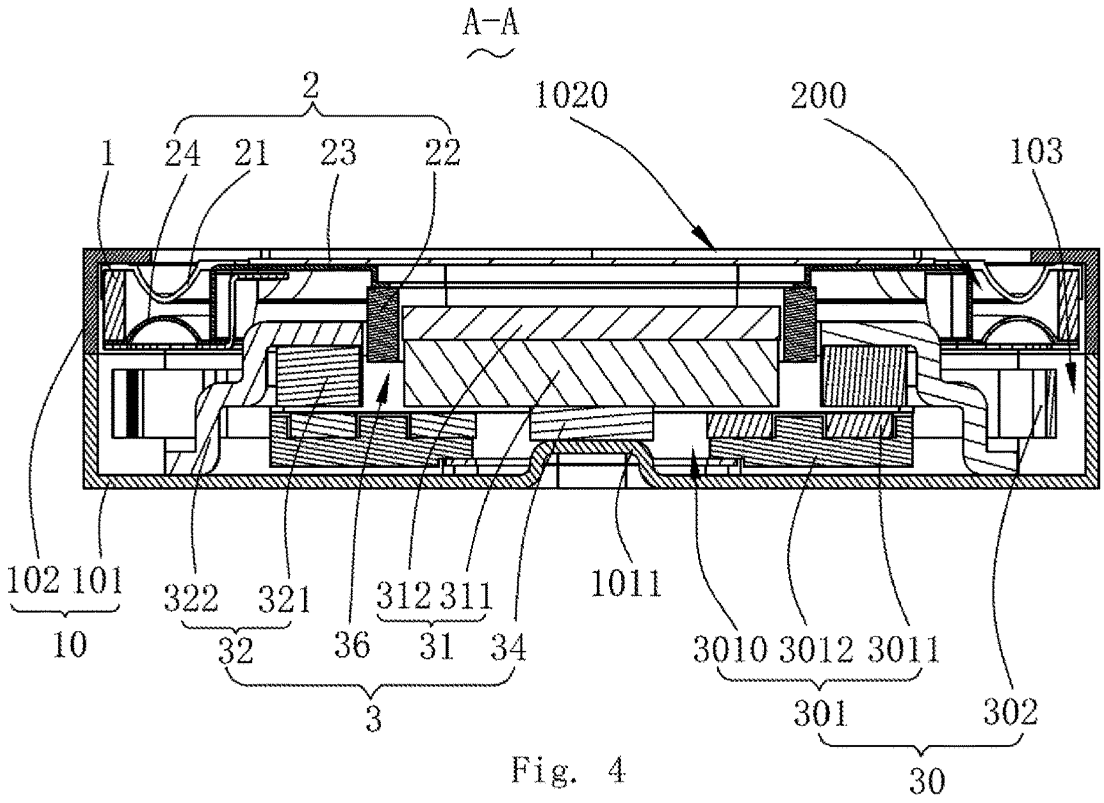
FIG. 4 is a cross-sectional view of the multifunctional sounding device taken along line AA in FIG. 1.
Figure 5:
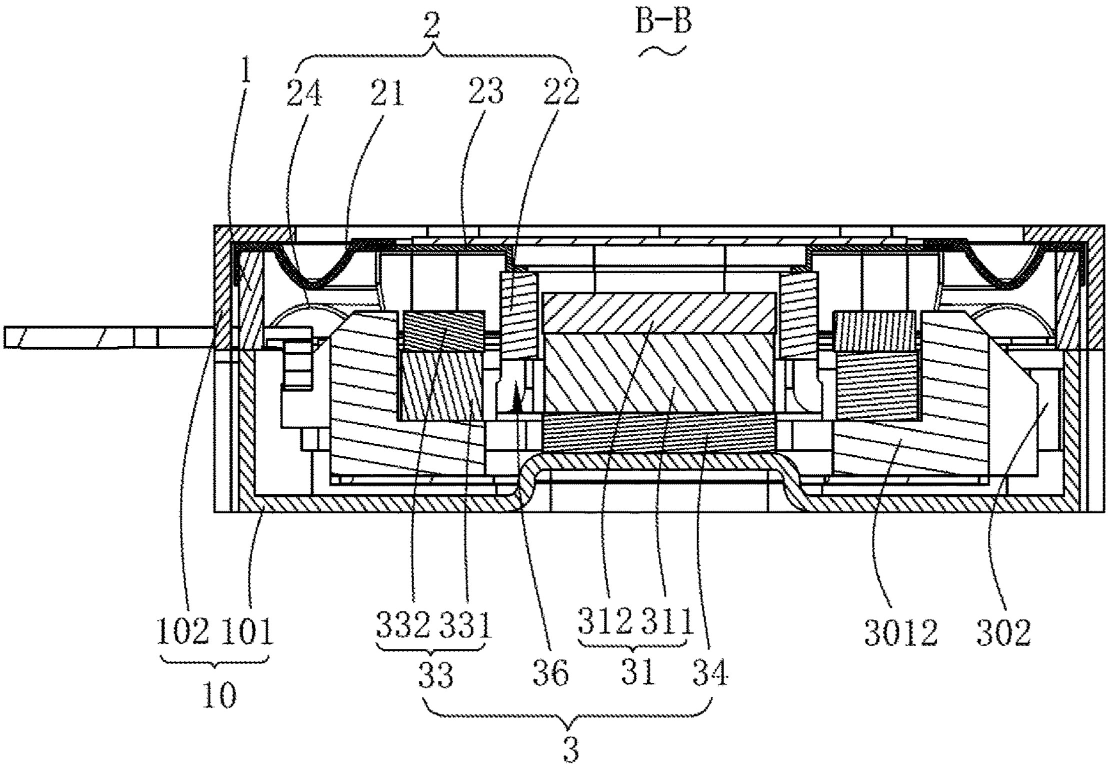
FIG. 5 is a cross-sectional view of the multifunctional sounding device taken along line BB FIG. 1.
Figure 6:
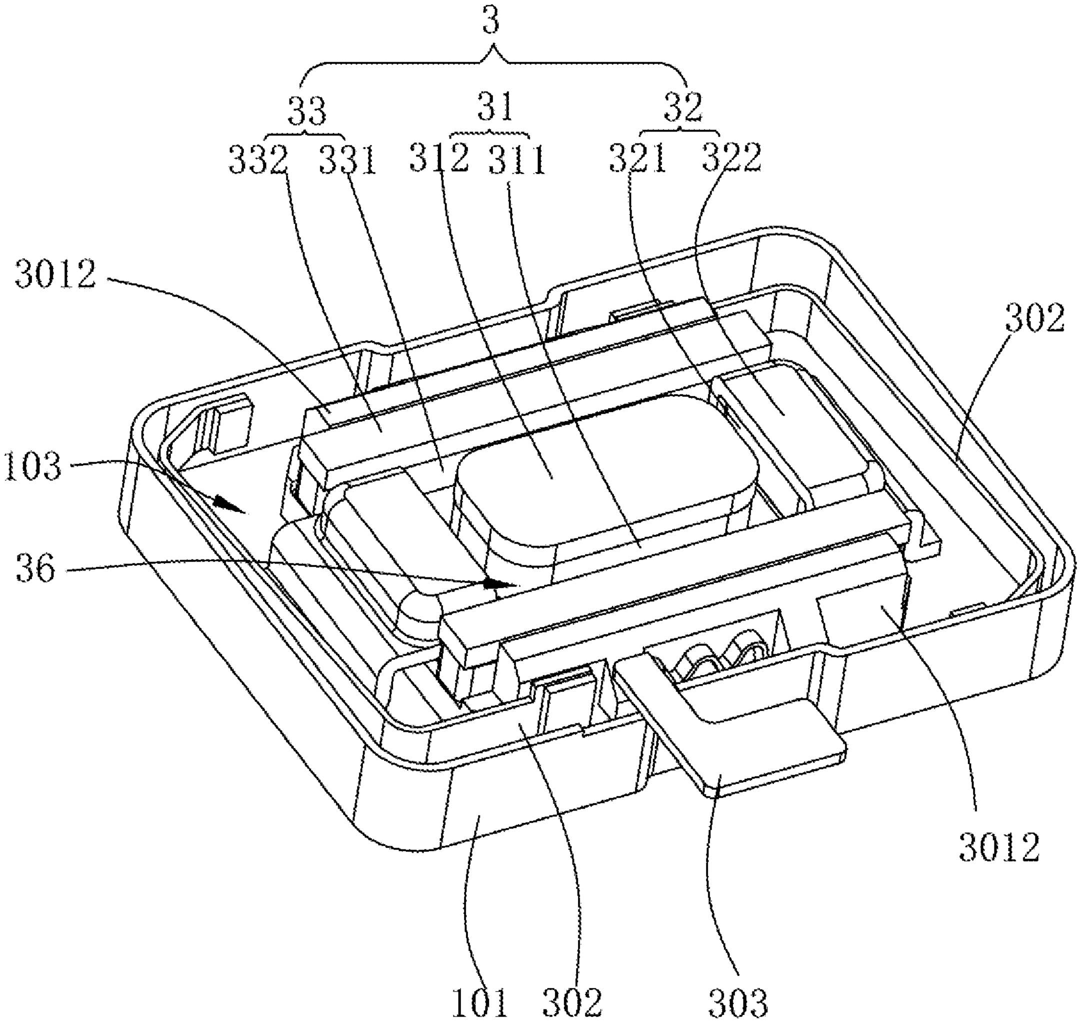
FIG. 6 is an isometric view of a magnetic circuit system and a motor assembly of the multifunctional sounding device of the present disclosure.
Figure 7:
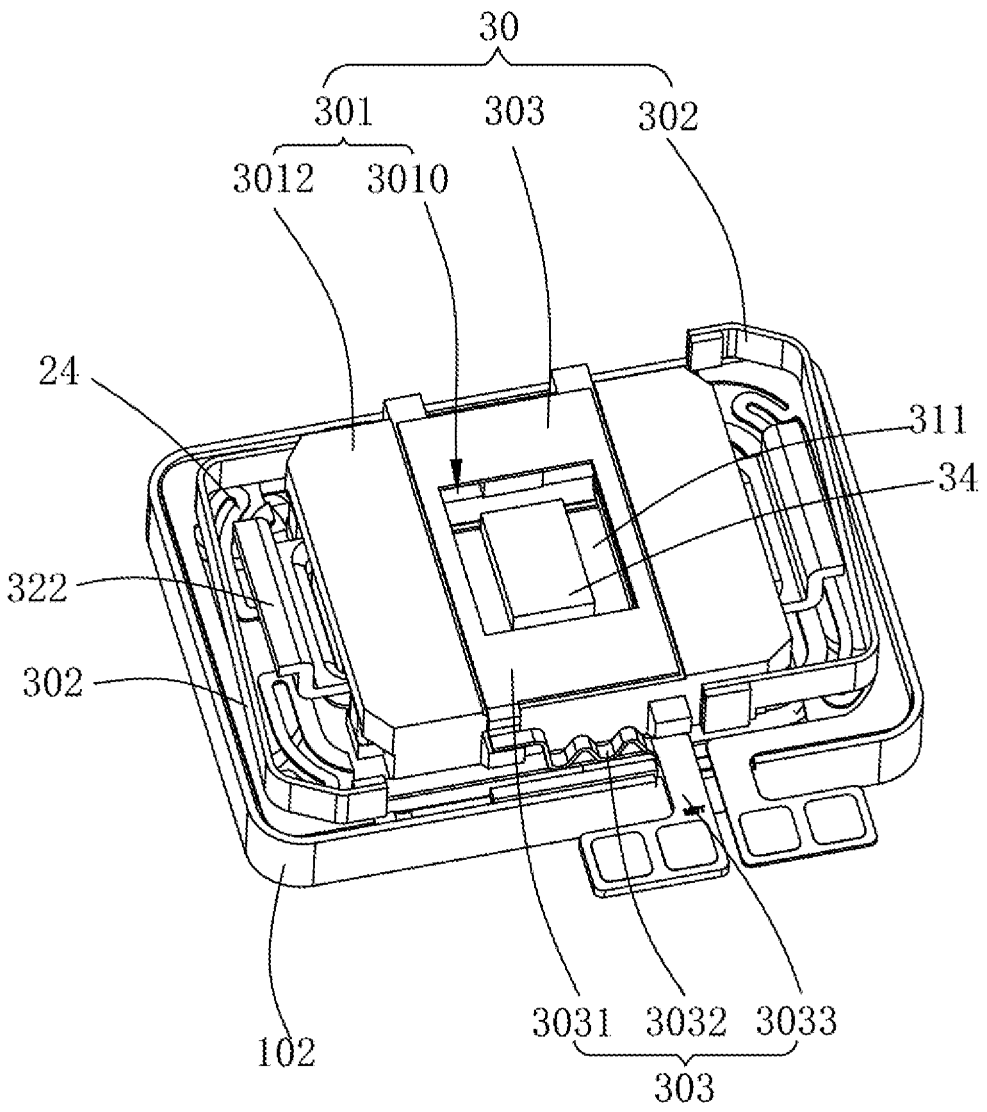
FIG. 7 is an isometric view of the multifunctional sounding device with a lower cover removed away.
Figure 8:
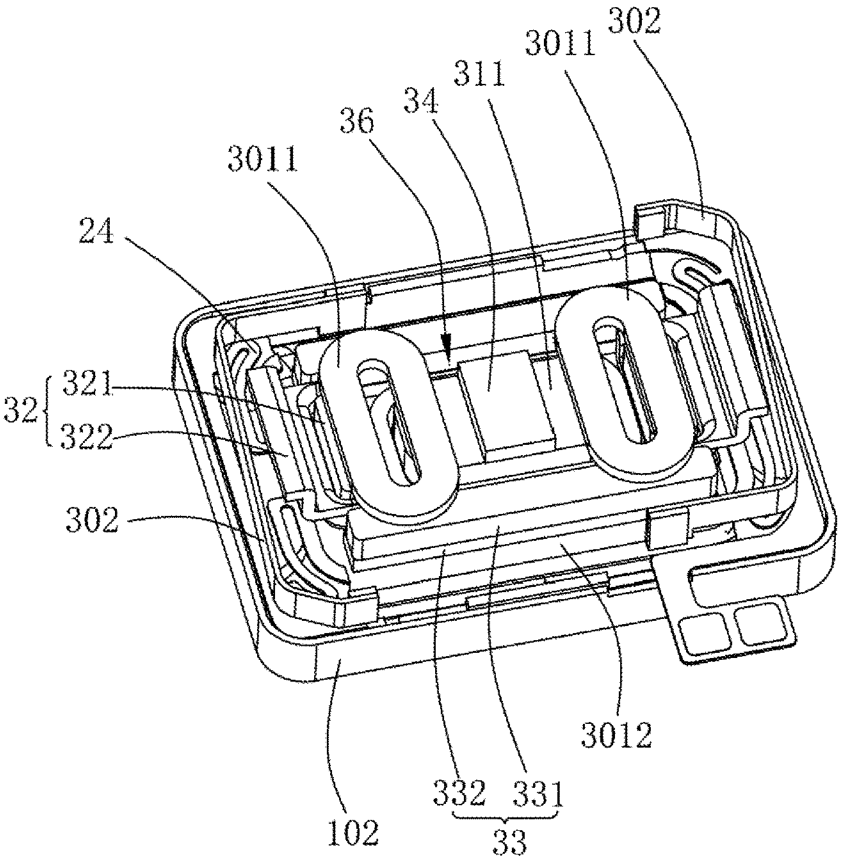
FIG. 8 is an isometric view of the multifunctional sounding device with a weight and a conductive connector removed away.
Figure 9:
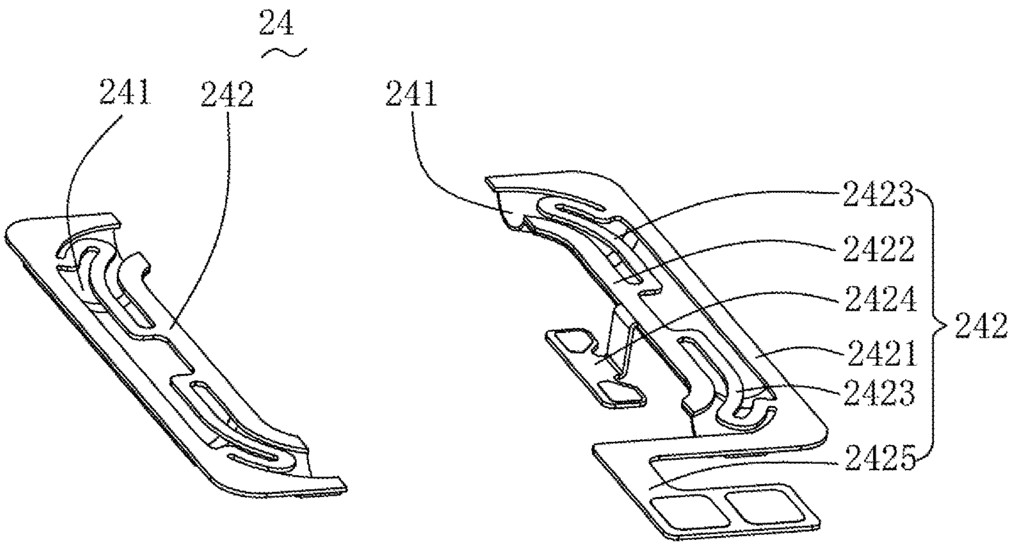
FIG. 9 is an isometric view of an elastic support assembly of the multifunctional sounding device of the present disclosure.

Referring to FIGS. 1-9, the multifunctional sounding device 100 includes a housing body 10 with a containment space 200 and a sounding unit 20 accommodated in the containment space 200 and a motor assembly 30.

The housing body 10 is provided with the sound outlet 1020 penetrating therethrough. The sound outlet 1020 connects the containment space 200 with the outside world. The sounding unit 20 transmits the sound to the outside through the sound outlet 1020. The sounding unit 20 and the housing body 10 together surround and form a back cavity 103.

In this embodiment, the housing body 10 includes an upper cover 102 and a lower cover 101 covering the upper cover 102. The upper cover 102 is provided with the sound outlet 1020 penetrating therethrough. of the upper cover 102 and the lower cover 101 are beneficial to the assembly of the multifunctional sounding device 100.

The sounding unit 20 includes a frame 1, a vibration system 2 and a magnetic circuit system 3 which is arranged with a magnetic gap 36 and drives the vibration system 2 to vibrate and produce sound.

In this embodiment, the frame 1 is rectangular.

Specifically, the vibration system 2 includes an upper diaphragm 21, a voice coil 22, a skeleton 23 and an elastic support assembly 24. The vibration system 2 is fixed to the frame 1. Specifically, the upper diaphragm 21 is fixed on the frame 1. The upper diaphragm 21 is pasted and fixed to the housing body 10 and opposite to the sound outlet 1020. In this embodiment, the upper diaphragm 21 is pasted and fixed on the upper cover 102. The upper diaphragm 21 and the housing body 10 together surround and form the back cavity 103. That is, the upper diaphragm 21, the upper cover 102 and the lower cover 101 together form the back cavity 103.

The voice coil 22 is inserted in the magnetic gap 36 and drives the upper diaphragm 21 to vibrate and produce sound. The skeleton 23 is fixed on the upper diaphragm 21. The voice coil 22 is suspended within the magnetic gap 36 by the skeleton 23. The elastic support assembly 24 and the upper diaphragm 21 are spaced apart. The elastic support assembly 24 is fixed to the frame 1. In this embodiment, the elastic support assembly 24 includes two. Two of the elastic support assemblies 24 are positioned on opposite sides of the short axis of the frame 1 respectively. Two of the elastic support assemblies 24 symmetrically distributed support the voice coil 22 more stably and vibration reliability is better.

In this embodiment, since the frame is rectangular, in order to make full use of the space on the opposite sides of the short axis of the frame 1, two of the elastic support assembly 24 are arranged on the frame 1 on opposite sides of the short axis. The elastic support assembly 24 is fixed to the frame 1. The other end of the elastic support assembly 24 is fixed to the skeleton 23. On the one hand, the elastic support assembly 24 is used to strengthen the vibration effect of the upper diaphragm 21, improve the acoustic performance of the multifunctional sounding device 100, and on the other hand, it is used to balance the swing of the vibration system 2, to improve the stability of the multifunctional sounding device 100.

In this embodiment, the elastic support assembly 24 includes a lower diaphragm 241 fixed to the skeleton 23 and a circuit board 242 fixed to the lower diaphragm 241. The voice coil 22 can be electrically connected to an external circuit through the circuit board 242 to realize independent control of the sounding unit 20. On the one hand, this structure is used to improve the vibration intensity and balance of the vibration system 2, and to suppress swinging. On the other hand, the voice coil 22 is led out to connect to an external power supply, avoiding the risk of the voice coil lead being easily broken when the lead wire structure of the voice coil is leading out the power supply.

Specifically, the circuit board 242 includes a first arm 2421 fixed to the frame 1, a second arm 2422 fixed to the voice coil 22, and two elastic arms 2423 respectively connecting the first arm 2421 and the second arm 2422. One end of the circuit board 242 is fixed to the frame 1, and the other end is fixed to the end of the voice coil 22 away from the upper diaphragm 21. The lower the diaphragm 241 is connected to the circuit board 242. For example, the circuit board 242 is attached and fixed on the side of the lower diaphragm 241 away from the upper diaphragm 21. On the one hand, it is used to strengthen the vibration effect of the upper diaphragm 21 and improve the acoustic performance of the sounding device 100; on the other hand, it is used to balance the swing of the vibration system 2 and improve the stability of the sounding device 100. The circuit board 242 includes two, and the two circuit boards 242 are arranged on opposite sides of the short axis of the frame 1 respectively. In order to realize that the voice coil 22 can be electrically connected with an external circuit through the circuit board 242, one of the circuit board 242 is also provided with a first conductive connection part 2424 for electrically connecting with the voice coil 22 and a second conductive connection part 2425 for electrically connecting with the external circuit. The first conductive connection part 2424 is bent and extended from the second arm 2422 toward the voice coil 22 and fixed to the voice coil 22. The second conductive connection part 2425 is bent and extended from the first arm 2421 in a direction away from the frame 1.

The magnetic circuit system 3 is accommodated in the back cavity 103.

The magnetic circuit system 3 includes a main magnetic circuit 31, a first auxiliary magnetic circuit 32 and a second auxiliary magnetic circuit 33 respectively surrounding the main magnetic circuit 31 and spaced from the main magnetic circuit 31 to form the magnetic gap 36.

The main magnetic circuit 31 includes a main magnet 311 and a main pole plate 312 stacked and fixed on the main magnet 311.

The magnetic circuit system 3 also includes a first support frame 34 fixed on the side of the main magnet 311 away from the vibration system 2.

The first support frame 34 and the main pole plate 312 are respectively fixed on opposite sides of the main magnet 311. The first support frame 34 positioned on a side close to the lower cover 101.

The first support frame 34 is fixed to the housing body 10. That is, the first support frame 34 is fixed to the lower cover 101. In this embodiment, in order to reduce the volume of the sounding unit 20, the lower cover 101 is provided with a protrusion part 1011 protruding toward the direction close to the magnetic circuit system 3. The first support frame 34 is fixed to the protrusion part 1011. This structure makes the volume of the multifunctional sounding device 100 small, and can also improve reliability.

The main magnet 311 is fixed on the first support frame 34. That is, the main magnet 311 is fixed to the lower cover 101 through the first support frame 34.

The first auxiliary magnetic circuit 32 includes a first auxiliary magnet 321 that surrounds the main magnet 311 and is spaced from the main magnet 311 to form the magnetic gap 36, and a first auxiliary pole plate 322 stacked and fixed to the first auxiliary magnet 321.

One end of the first auxiliary pole plate 322 is fixed to the side of the first auxiliary magnet 321 close to the vibration system 2, and the other end of the first auxiliary pole plate 322 is fixed to the housing body 10.

The second auxiliary magnetic circuit 33 includes a second auxiliary magnet 331 that surrounds the main magnet 311 and is spaced from the main magnet 311 to form the magnetic gap 36, and a second auxiliary pole plate 332 stacked and fixed on the second auxiliary magnet 331.

The first auxiliary magnet 321 and the second auxiliary magnet 331 respectively surround the main magnet 311 and are spaced from the main magnet 311 to form the magnetic gap 36. This structure is beneficial to improve the driving force of the magnetic circuit of the magnetic gap 36.

In this embodiment, the magnetic circuit system 3 is rectangular. The first auxiliary magnet 321 includes two and are positioned on opposite sides of the main magnet 311 respectively. In this embodiment, the two first auxiliary magnets 321 are positioned on opposite sides of the short axis of the main magnet 311. The elastic support assembly 24 is set on the same side as the first auxiliary magnet 321. The first auxiliary magnet 321 is fixed to the housing body 10.

The second auxiliary magnet 331 includes two and are positioned on opposite sides of the main magnet 311 respectively. In this embodiment, the two second auxiliary magnets 331 are positioned on opposite sides of the long axis of the main magnet 311. The second auxiliary magnet 331 is fixed to the motor assembly 30. This structure enables the second auxiliary magnet 331 to be used as a counterweight to the motor assembly 30 so as to increase the vibration amplitude of the motor assembly 30. This makes the motor assembly 30 output higher acceleration, thereby improving the vibration performance of the multifunctional sounding device 100 of the present disclosure.

The main pole plate 312 and the main magnet 311 stacked in sequence are spaced apart from the second auxiliary pole plate 332 and the second auxiliary magnet 331 stacked in sequence to form the magnetic gap 36. This structure increases the density of the magnet on both sides of the magnetic gap 36, which is conducive to improving the driving force of the magnetic circuit of the magnetic gap 36, so that the acoustic performance of the multifunctional sounding device 100 of the present disclosure is good.

The motor assembly 30 is accommodated in the containment space 200. Specifically, the motor assembly 30 is accommodated in the back cavity 103.

Specifically, the motor assembly 30 includes a vibration unit 301 arranged on the side of the magnetic circuit system 3 away from the vibration system 2, an elastic member 302 suspending the vibration unit 301 in the containment space 200, and a conductive connector 303.

The vibration unit 301 includes the driving coil 3011 and the weight 3012.

The driving coil 3011 is positioned on the side of the first auxiliary magnet 321 away from the vibration system 2. The driving coil 3011 and the second auxiliary pole plate 332 are positioned on opposite sides of the second auxiliary magnet 331, respectively. The second auxiliary magnet 331 is fixed on the vibration unit 301. Wherein, the driving coil 3011 is fixed on the second auxiliary magnet 331. This structure makes the driving coil 3011 and the second auxiliary magnet 331 in the vibration unit 301 of the motor assembly 30 suspended in the back cavity 103 through the elastic member 302. Wherein, the second auxiliary magnetic circuit 33 in the magnetic circuit system 3 serves as part of the vibration mass of the vibration unit 301. This reduces the weight of the weight 3012, releasing volume of some of the weight 3012. In the housing body 10 with the same external volume, the volume released by the weight 3012 can be converted into the cavity of the back cavity 103 of the sounding unit 20, which is beneficial to the sounding unit 20 performance improvement. In addition, the counterweight of the weight 3012 is reduced, which is beneficial to save the cost of the weight materials. That is to say, the mover of the motor assembly 30 actually consists of the driving coil 3011, the weight 3012 and the second auxiliary magnetic circuit 33 together. The second auxiliary magnetic circuit 33 includes a second auxiliary magnet 331 and a second auxiliary pole plate 332. That is, the driving coil 3011, the weight 3012, the second auxiliary magnet 331 and the second auxiliary pole plate 332 together constitute the mover of the motor assembly 30. Therefore, when the driving coil 3011 is energized, the main magnet 311 and the first auxiliary magnet 321 fixed on the housing body 10 provide driving force for the driving coil 3011 at the same time. Therefore, the motor assembly 30 saves the volume of the magnet as the stator, and provides the saved volume to the back cavity 103, so that the overall thickness and volume of the multifunctional sounding device 100 of the present disclosure are small, acoustic performance is excellent. This structure also reduces parts cost and assembly cost, making the multifunctional sounding device 100 widely used.

The driving coil 3011 is positioned within the magnetic field range of the main magnet 311 fixed to the housing body 10 and the first auxiliary magnet 321, and interact to generate an electromagnetic field. The mutual driving force with the main magnet 311 and the first auxiliary magnet 321 is realized by controlling the current direction of the driving coil 3011. The main magnet 311 and the first auxiliary magnet 321 are fixed to the housing body 10 and cannot move, and serve as the stator. The second auxiliary magnetic circuit 33, the driving coil 3011 and the weight 3012 are suspended in the housing body 10 through the elastic member 302 to move, serve as the mover. Thus, the main magnet 311 and the first auxiliary magnet 321 make the driving coil 3011, the weight 3012 and the second auxiliary magnetic circuit 33 vibrate together. The driving coil 3011 and the second auxiliary magnetic circuit 33 drive the entire vibration unit 301 to vibrate.

The driving coil 3011 includes two. The two driving coils 3011 are respectively arranged on opposite sides of the first support frame 34 along the vibration direction of the vibration unit 301.

The weight 3012 is used to counterweight the vibration unit 301 and increase the weight of the vibration unit 301 to increase the vibration amplitude of the vibration unit 301. When set in this way, the motor assembly 30 outputs higher acceleration, thereby improving the vibration performance and vibration effect of the multifunctional sounding device 100 of the present disclosure.

The elastic member 302 is respectively fixed on opposite sides of the weight 3012 along the vibration direction of the vibration unit 301. The driving coil 3011 is fixed to the weight 3012. In this embodiment, the weight 3012 is provided with an installation hole 3010 penetrating therethrough. The first support frame 34 is fixed to the housing body 10 after passing through the installation hole 3010. This structure makes the internal structure of the multifunctional sounding device 100 compact and has good acoustic effect, which is beneficial to the miniaturization application of the multifunctional sounding device 100.

The elastic member 302 includes two and are respectively arranged on opposite sides of the weight 3012 along the vibration direction of the vibration unit 301. In this embodiment, at least two of the elastic member 302 are respectively fixed on opposite sides of the weight 3012 along the vibration direction. Wherein, the elastic member 302 is a spring in V shape or C shape. In this embodiment, the elastic member is a spring in a V shape.

The conductive connector 303 is electrically connected to the driving coil 3011. The conductive connector 303 includes a fixed part 3031 fixed on the side of the weight 3012 away from the vibration system 2, an elastic arm 3032 extended and bent from the fixed part 3031, and an extension part 3033 passing through the housing body 10 and at least partially exposed to the housing body 10. The elastic arm 3032 acts as the vibrating strength arm in the conductive connector 303, when the fixed part 3031 fixed to the vibration unit 301 moves, through the connection of the elastic arm 3032 that can vibrate the strength arm, the vibration is slowed down and not transmitted to the extension part 3033. The extension part 3033 passing through the housing body 10 is provided with a welded pad for welding, so as to realize the transmission of external electrical signals to the driving coil 3011, thereby realizing the independent control of the motor assembly.

Compared with related technologies, the multifunctional sounding device of the present disclosure includes a housing body with a containment space, a sounding unit accommodated in the containment space and a motor assembly. In the multifunctional sounding device of the present disclosure, a magnetic circuit system is arranged through the sounding unit. The magnetic circuit system includes a main magnetic circuit, a first auxiliary magnetic circuit and a second auxiliary magnetic circuit respectively surrounding the main magnetic circuit and forming a magnetic gap with the main magnetic circuit with space. The multifunctional sounding device of the present disclosure is also provided with a vibration unit with driving coil and an elastic member through the motor assembly. The main magnetic circuit is fixed to the housing body. The first auxiliary magnetic circuit is fixed to the housing body; the second auxiliary magnetic circuit is fixed to the vibration unit. This structure enables both the driving coil and the second auxiliary magnetic circuit in the vibration unit of the motor assembly to be suspended in the containment space through the elastic member The second auxiliary magnetic circuit, as a part of the vibration weight of the vibration unit, can reduce the counterweight of the weight in the vibration unit, release part of the volume of the weight. In the housing body with the same external volume, the volume released by the weight can be converted into the cavity of the back cavity of the sounding unit, which is beneficial to the performance improvement of the sounding unit. Therefore, when the driving coil is energized, the main magnetic circuit fixed to the housing body and the first auxiliary magnetic circuit simultaneously provide driving force for the driving coil. Thus, the motor assembly doesn't need to be arranged with the magnet as the stator, and the saved volume is provided to the containment space. Therefore, the overall thickness of the multifunctional sounding device of the present disclosure is small, the volume is small, and the acoustic performance is excellent; this structure also reduces the cost of parts and assembly costs, making the multifunctional sounding device widely used.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A multifunctional sounding device, including:

a housing body with a containment space;

a sounding unit accommodated in the containment space, having a frame, a vibration system, and a magnetic circuit system with a magnetic gap for driving the vibration system to vibrate and produce sound;

a motor assembly accommodated in the containment space, having a vibration unit with a voice coil disposed on a side of the magnetic circuit system away from the vibration system, and an elastic member suspending the vibration unit in the containment space; wherein the magnetic circuit system includes a main magnetic circuit, a first auxiliary magnetic circuit, and a second auxiliary magnetic circuit respectively surrounding the main magnetic circuit and forming a magnetic gap with the main magnetic circuit, and the main magnetic circuit and the first auxiliary magnetic circuit are fixed to the housing body, and the second auxiliary magnetic circuit is fixed to the vibration unit;

wherein, the main magnetic circuit includes a main magnet and a main pole plate assembled with the main magnet; the magnetic circuit system also includes a first support frame fixed on the side of the main magnet away from the vibration system; the first support frame is fixed to the housing body; and, the first support frame and the main pole plate are respectively fixed on opposite sides of the main magnet.

2. The multifunctional sounding device as described in claim 1, wherein, the first auxiliary magnetic circuit includes a first auxiliary magnet surrounding the main magnet and forming a magnetic gap with the main magnet through space, and a first auxiliary pole plate attached to the first auxiliary magnet; one end of the first auxiliary pole plate is fixed to a side of the first auxiliary magnet close to the vibration system, and the other end of the first auxiliary pole plate is fixed to the housing body.

3. The multifunctional sounding device as described in claim 2, wherein, the second auxiliary magnetic circuit includes a second auxiliary magnet surrounding the main magnet and forming a magnetic gap with the main magnet and a second auxiliary pole plate disposed on the second auxiliary magnet; the second auxiliary magnet is fixed to the vibration unit; the driving coil and the second auxiliary pole plate are respectively positioned on opposite sides of the second auxiliary magnet; further the multifunctional sounding device includes two first auxiliary magnets positioned on opposite sides of a short axis of the main magnet, and two second auxiliary magnets positioned on opposite sides of a long axis of the main magnet.

4. The multifunctional sounding device as described in claim 3, wherein, the vibration system includes a diaphragm fixed on the frame, a voice coil inserted in the magnetic gap and driving the vibration of the diaphragm, a skeleton fixed to the diaphragm, and an elastic support assembly spaced apart from the diaphragm; the diaphragm is pasted and fixed on the housing body; the diaphragm and the housing body together form the back cavity; the voice coil is suspended within the magnetic gap by the skeleton; the elastic support assembly is arranged on the same side as the first auxiliary magnet; one end of the elastic support assembly is fixed to the frame; the other end of the elastic support assembly is fixed to the skeleton.

5. The multifunctional sounding device as described in claim 4, wherein, the housing body includes an upper cover and a lower cover covering the upper cover; the upper cover includes a sound outlet penetrating therethrough; the diaphragm is pasted and fixed on the upper cover and set opposite to the sound outlet; the lower cover has a protrusion part protruding toward the direction close to the magnetic circuit system; the first support frame is fixed to the protrusion part.

6. The multifunctional sounding device as described in claim 1 having two driving coils which are respectively arranged on opposite sides of the first support frame along a vibration direction of the vibration unit.

7. The multifunctional sounding device as described in claim 6, wherein, the vibration unit further includes a weight being fixed with the driving coil and having two opposite sides suspended by the elastic members along the vibration direction of the vibration unit; the weight further includes an installation hole through which the first support frame passes and is fixed to the housing body.

8. The multifunctional sounding device as described in claim 7, wherein, an amount of the elastic member is two, and the two elastic members are respectively arranged on opposite sides of the weight along the vibration direction of the vibration unit.

9. The multifunctional sounding device as described in claim 7, wherein, the motor assembly further includes a conductive connector electrically connected to the driving coil; the conductive connector includes a fixed part fixed on the side of the weight away from the vibration system, an elastic arm bent and extended by the fixed part, and an extension part passing through the housing body and at least partially exposed on the housing body.

* * * * *